United States Patent [19]

Greiner

[11] 3,959,968

[45] June 1, 1976

[54] STEERING VALVE WITH LINEAR SPOOL DAMPENING

[75] Inventor: Jonny R. Greiner, Phoenix, Ariz.

[73] Assignee: Caterpillar Tractor Co., Peoria, Ill.

[22] Filed: Apr. 25, 1975

[21] Appl. No.: 571,871

[52] U.S. Cl. .................................. 60/384; 60/386; 60/403; 92/8; 251/54
[51] Int. Cl.² ........................................ F15B 9/08
[58] Field of Search ............. 60/384, 386, 403, 385; 251/48, 54; 92/8

[56] References Cited
UNITED STATES PATENTS

| | | | |
|---|---|---|---|
| 2,919,679 | 1/1960 | Lincoln et al. | 251/54 X |
| 3,385,057 | 5/1968 | Pruvot et al. | 60/384 |
| 3,452,543 | 7/1969 | Goff et al. | 60/384 |

Primary Examiner—Edgar W. Geoghegan
Attorney, Agent, or Firm—Phillips, Moore, Weissenberger Lempio & Strabala

[57] ABSTRACT

The invention is concerned with an improvement in a fluid controller for a power steering system which includes a housing having a fluid inlet for connection to the discharge side of a main fluid pump, an outlet for connection to the suction side of the main pump and a pair of ports for connection to the opposite sides of a dual acting hydraulic device such as a balanced cylinder of the power steering system for controlling the flow of pressurized fluid to the device. The controller includes a gear set which serves as a fluid meter or as a manual pump, depending upon the operativeness of the main fluid pump, and a spool valve shiftable axially to control the flow through the inlet, the gear set, the cylinder ports and the outlet. A control shaft is mounted for rotation on the housing responsive to movement of a steering wheel and is coupled to the spool valve for effecting axial shifting of the spool valve in response to rotation of the control shaft. A wobble shaft passes from the interior of the spool valve to the gear set. A bearing plate is included between the gear set and the spool valve. The improvement comprises a fluid filled cylindrical dash pot cavity formed into said bearing plate on the spool valve side thereof positioned to receive a member extending from the spool valve and which includes restricted flow means through which said fluid is forced responsive to axial movement of said spool valve thus serving to prevent overshoot of the spool valve responsive to rotation of the control shaft and resulting oversteering of said power steering system.

6 Claims, 4 Drawing Figures

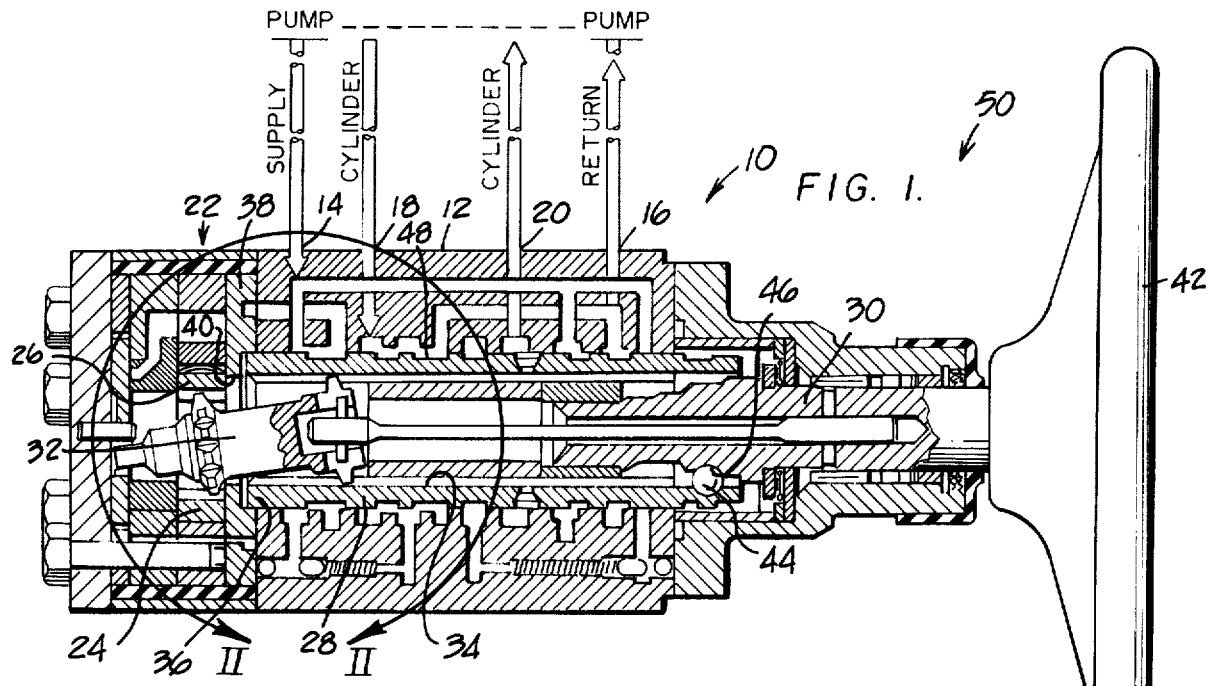
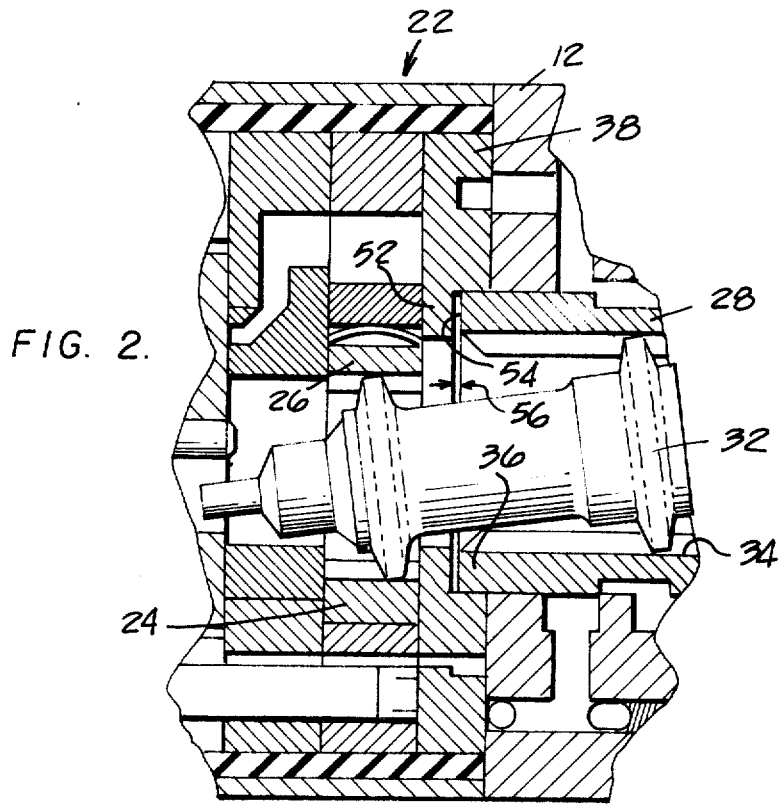

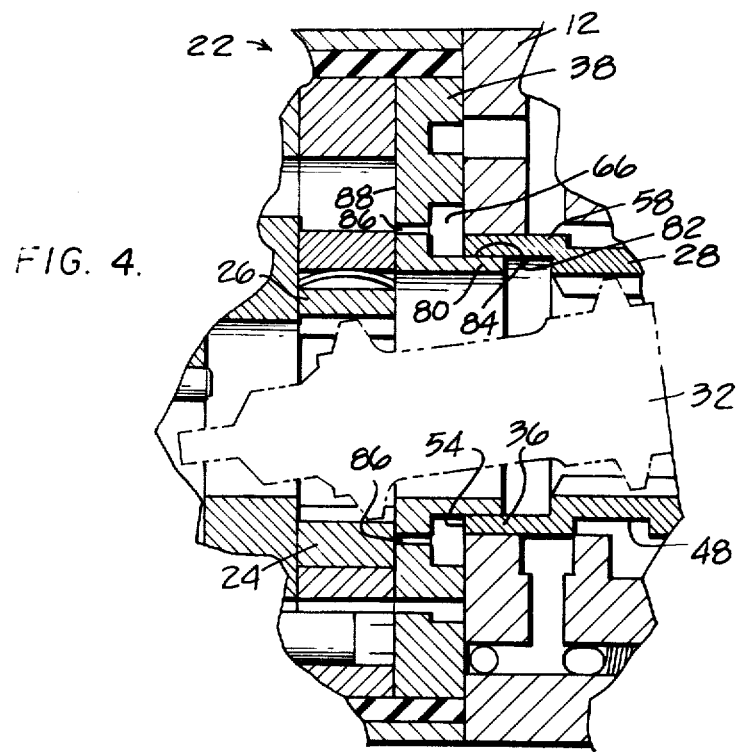
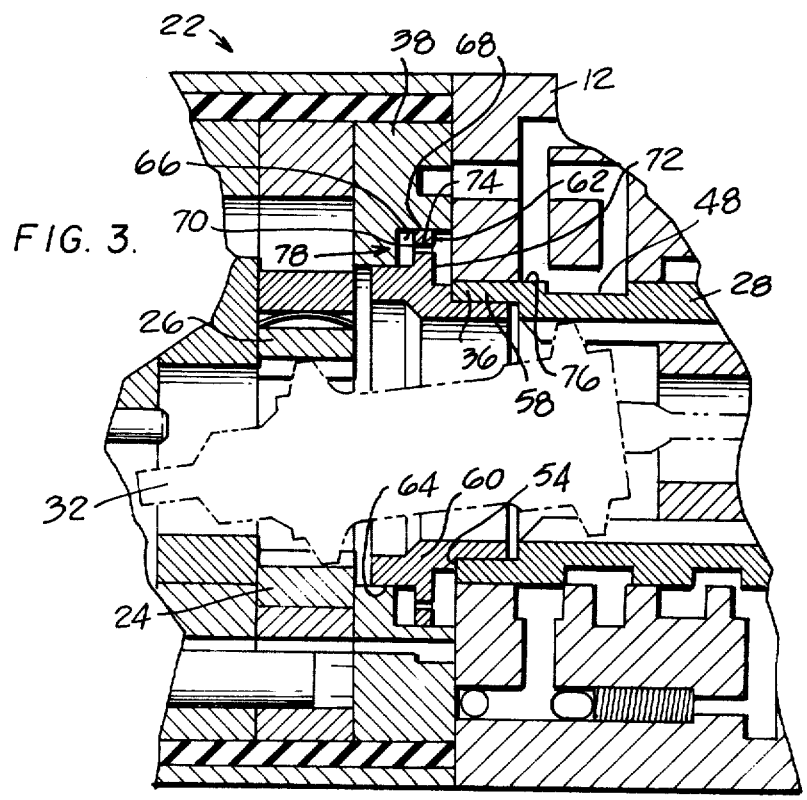

STEERING VALVE WITH LINEAR SPOOL DAMPENING

BACKGROUND OF THE INVENTION

1. Field of the Invention

The invention is concerned with an improvement in a fluid controller. More particularly, the invention is concerned with an improvement in a dual acting hydraulic device which controls flow to a balanced cylinder of a power steering system. The improvement relates to means for preventing overshoot of a spool valve portion of such a fluid controller by provision of a dash pot which linearly dampens the motion of said spool valve and resulting serious vibratory instability in the motion of a vehicle using such a fluid controller in its power steering system.

2. Prior Art

A number of hydraulic devices are known for providing power steering for vehicles. Typical such devices are discussed for example in "HGA Hydrostatic Steering System, Hydraguide (Trademark of TRW Inc.) Ross Engineering & Service Manual", Manual No. HGA-200, TRW Inc. 1971 and in U.S. Pat. Nos. 3,288,034; 3,385,057 and 3,452,543. The devices taught by the above manual and patents are essentially of the gerotor type and have advantageously been used to provide power steering for a number of vehicles along with manual steering if the main fluid pump supplying fluid thereto is inoperative.

A particular problem of vibratory instability due to overshoot of the spool valve of the gerotor type devices has been discovered when utilizing these prior art gerotor devices. This problem is especially magnified in systems wherein the hydraulic flow rates are especially great as for example in off-road vehicles and other especially heavy duty equipment as is used in the construction industry. With the greater flow rates which occur within the hydrostatic power steering devices used in such systems, it has been found that the instability which occurs therein is multiplied in effect to cause very significantly erratic and continuing vibratory motion of the vehicles using such devices. With smaller vehicles where lower flow rates occur within the power steering hydraulic controller, instability still occurs but motion resulting therefrom is less erratic because of the lesser flow forces created in the system.

Attempts to solve this problem by frictional dampening of the spool valve have been found by us to cause higher wheel effort, increased operating temperatures and failure of the spool valve to return to its centered position.

It would be highly advantageous to provide a straight forward and inexpensive improvement in a gerotor hydraulic device useful for power steering purposes such as those taught in the above mentioned manual and patents whereby such a hydraulic controller device could be used in heavy duty equipment such as off-road vehicles and the like and wherein erratic motion would be prevented in a smooth working, low noise, low cost device. The present invention provides just such an improvement.

SUMMARY OF THE INVENTION

The invention is concerned with an improvement in a fluid controller for a power steering system including a housing having a fluid inlet for connection to the discharge side of a fluid pump, an outlet for connection to the suction side of the fluid pump and a pair of ports for connection to the opposite sides of a dual acting hydraulic device such as a balanced cylinder of the power steering system for controlling the flow of pressurized fluid to the device. The controller includes a gear set, more particularly a gerotor gear set, which includes a rotatable wobble shaft and which serves as a fluid meter or as a manual pump, depending upon the operativeness of the fluid pump, and a spool valve shiftable axially to control the flow from the inlet, the gear set, the cylinder ports and the outlet. The wobble shaft passes through a bearing plate between the gear set and the sleeve valve, said bearing plate having a central opening therethrough through which said wobble shaft passes. A control shaft is mounted for rotation on the housing responsive to movement of the steering wheel and is coupled to the spool valve for effecting axial shifting of the spool valve in response to rotation of the control shaft. The improvement of the invention comprises a fluid filled cylindrical dash pot cavity formed into the bearing plate on a spool valve side thereof, said cavity being positioned to receive a member extending from said spool valve adjacent said bearing plate and including restricted flow means through which said fluid is forced responsive to axial movement of said spool valve thus serving to prevent overshoot of said spool valve responsive to rotation of said control shaft. When overshoot of the spool valve is prevented, this in turn prevents instability by said power steering system and erratic motion of off-road and other heavy duty vehicles using said steering system and having relatively high hydraulic flow rates therewithin.

BRIEF DESCRIPTION OF THE DRAWINGS

The invention will be better understood by reference to the drawings in the Figures of which like numbers denote like parts throughout and wherein:

FIG. 1 illustrates a fluid controller of the prior art connected to a steering wheel input to provide power steering capability.

FIG. 2 illustrates a detail in the construction of the prior art fluid controller illustrated in FIG. 1.

FIG. 3 illustrates a preferred embodiment of the improvement of the present invention which improvement replaces the structure illustrated in FIG. 2.

FIG. 4 illustrates another preferred embodiment of the invention which replaces the structure illustrated in FIG. 2.

DETAILED DESCRIPTION OF THE PREFERRED EMBODIMENTS

A fluid controller 10 of the prior art is illustrated in FIG. 1. The fluid controller 10 includes a housing 12 having a fluid inlet 14 for connection to the discharge side of a main fluid pump and an outlet 16 for connection to the suction side of the main pump (PUMP). The controller 10 also includes a pair of ports 18 and 20 for connection to the opposite sides of a dual acting hydraulic device such as a balanced cylinder (CYLINDER) of a power steering system for controlling the flow of pressurized fluid to the device. The controller 10 includes a gear set indicated generally at reference numeral 22 which in the illustrated embodiment comprises a pair of hypocycloidal gears one of which is indicated at reference numeral 24 and the other of which is indicated at reference numeral 26. The gear set 22 serves as a fluid meter or as a manual pump, depending upon the operativeness of the main fluid pump. The fluid controller further includes a spool valve 28 which is shiftable axially to control the flow from the fluid inlet 14, the gear set 22, the cylinder ports 18 and 20 and the outlet 16. A control shaft 30 is mounted for rotation in the housing and is coupled to the spool valve 28 for effecting axial shifting of the spool valve 28 in response to rotation of the control shaft 30. A wobble shaft 32, which is generally cylindrically shaped, passes from a cavity defined by an interior surface 34 of the spool valve 28 and through a first end 36 of the spool valve 28 to the gear set 22. Intermediate the spool valve 28 and the gear set 22 there is provided a bearing plate 38 which is attached to the housing 12 and which has a circular opening 40 centrally therein through which the wobble shaft 32 passes. Rotation of a steering wheel 42 leads to rotation of the control shaft 30 whereby the spool valve 28 is forced leftwardly or rightwardly through action of a ball 44 slidingly within a helical channel 46 on the surface of the control shaft 30. The ball 44 is held in a fixed position on the interior surface 34 of the spool valve 28. Thereby, there results an in or out motion of the spool valve 28 within the housing 12 whereby appropriate of a plurality of undercuts 48 on the exterior of the spool valve 28 are aligned to direct flow from the fluid controller 10 which is part of the overall power steering apparatus 50. The apparatus described above is all well known in the prior art. A much fuller description of such an apparatus may be found, for example, in U.S. Pat. No. 3,452,543 the disclosure of which is hereby referred to and incorporated herein by reference thereto.

The improvement of the present invention is illustrated most clearly by reference to FIGS. 2, 3 and 4. FIG. 2 as previously mentioned is illustrative of the prior art apparatus and each of FIGS. 3 and 4 represents an embodiment of the improvement of the present invention in said prior art apparatus.

Referring to FIG. 2, it is seen that the spool valve 28 at its first end 36 moves in and out as controlled by the steering wheel 42. The movement of the first end 36 of the spool valve 28 is restricted due to the pitch of the helical channel 46 whereby said first end 36 of the spool valve 28 cannot travel far enough to contact a shoulder 52 of the bearing plate 38. The space defined by the interior surface 34 of the spool valve 28 and surrounding the wobble shaft 32 and the gear set 22 is filled with fluid in the usual manner. Some slight damping of the motion of the spool valve 28 thus occurs as a flat surface 54 at the first end 36 of the spool valve 28 moves through the fluid in the space 56. Such damping is sufficient when the change in flow from the inlet 14 to one side of the steering cylinder as via the port 20 or to the other side of the steering cylinder as via the port 18 which is induced by movement of the steering wheel 42 occurs in a relatively low flow rate system as can be used in relatively light vehicles although even in low flow rate systems there is a tendency for some instability to occur. In relatively heavy vehicles, such as off-road trucks and other heavy construction and earth moving equipment, the flow rates which are handled by the fluid controller 10 responsive to movement of the steering wheel 42 of the power steering apparatus 50 are extremely great since very great flow rates must be used to provide sufficient pressure to the steering cylinder to handle the heavy weight of the vehicle. In this situation, the damping provided by the flat surface 54 of the spool valve 28 is much too insufficient to adequately compensate for instability. Thus, as the steering wheel 42 is moved from one position to another the valve spool 28 in such heavy vehicles overshoots its desired position and then overshoots back past its desired position. This leads to erratic vibratory motion of the vehicle. This behavior continues to occur and leads to violent shaking of the vehicle.

The present invention provides a unique and effective solution to the problem of instability and erratic motion which occurs in very heavy vehicles when utilizing an apparatus as shown in FIG. 1. The improvement is specifically concerned with providing adequate damping of the motion of the spool valve 28 within the housing 12 of the fluid controller 10 without increasing wheel effort or operating temperature due to friction.

Referring most particularly to FIG. 3, there is illustrated therein one preferred embodiment of the improvement of the present invention. In the embodiment illustrated in FIG. 3, the one end 36 of the spool valve 28 has been reemed out so as to form a collar 58 and a piston 60 has been matingly fit within the collar 58 which together form a member extending from the spool valve 28, the internal diameter of the piston 60 being generally the same as the internal diameter of the spool valve 28 removed from the collar portion 58 thereof whereby the wobble shaft 32 can adequately pass therethrough. The piston 60 includes a flange 62 radially extending from an outer surface 64 thereof. The flange 62 is designed to fit within a cylindrically shaped cavity 66 in the bearing plate 38. An outer peripheral surface 68 of the flange 62 fits slidingly against the cylindrical surface of the cylindrically shaped cavity 66. The cavity 66 is fluid filled so as to provide an overall dash pot arrangement whereby motion of the spool valve 28 is damped by a resistance thereto provided by the fluid in the cavity 66 acting against the motion of the flange 62. Thus, the spool valve 28 can only move as fast as fluid can flow from a gear set side 70 of the flange 62 to a spool valve side 72 thereof. It is clear that in this embodiment of the invention movement of the spool valve 28 is equally damped when moving in and out relative to the bearing plate 38. Generally such fluid can flow around the outer peripheral surface 68 of the flange 62.

In some instances it is desirable to provide at least one orifice 74 through the flange 62 from the gear set side 70 thereof to the spool valve side 72 thereof. Use of a plurality of orifices 74, indicated generally equally spaced about the flange 62, is desirable for even operation thereof. While the piston 60, as illustrated in FIG. 3, is shown as a separate part from the spool valve 28, it is clear that it can be made integral therewith thereby removing the necessity for reeming out the spool valve 28 adjacent the first end 36 thereof to receive said piston 60. Also, if desired, the valve body 12 can be partially reemed out adjacent the first end 36 of the spool valve 28 and a piston such as the piston 60 can be rigidly fit about an exterior portion 76 of the spool valve 28 adjacent the first end 36 thereof. It is clear that a dash pot arrangement 78 results which prevents instability which leads to erratic motion of heavy vehicles such as off-road trucks and the like, when the steering wheel 42 thereof is manipulated even though in such heavy vehicles very great flows are handled by the inlet 14 and the outlet 16 and are supplied to the steering cylinder by the ports 18 and 20. Also, since no significant frictional resistance is introduced, higher wheel effort and increased operating temperatures are not introduced by the improvement of the invention.

Referring now to FIG. 4, there is illustrated another preferred embodiment of the invention. In this embodiment, a cylindrically shaped cavity 66 is once again formed in the bearing plate 38 on the spool valve side thereof. The bearing plate 38 is further modified to include a ring portion 80 which extends from the bearing plate 38 to fit in sliding relation against an interior surface 82 of a member extending from the spool valve 28, in this case the collar 58. Generally, the interior surface 82 is smooth machined as is an exterior surface 84 of the ring portion 80 so as to assure a smooth sliding low friction fit. In the embodiment illustrated in FIG. 4, the flat surface 54 at the first end 36 of the spool valve 28 travels into the cylindrically shaped cavity 66 and slides away from said cavity 66 responsive to movement of the steering wheel 42. Once again the cavity 66 is oil filled as is the entire inside of the controller 10. In this embodiment an orifice 86 is provided between the cavity 66 and a side 88 of the bearing plate 38 which faces the gear set 22. In this manner, movement of the spool valve 28 is damped by the rate of flow of fluid through the orifice 86. Thus, as the flat surface 54 of the spool valve 28 moves towards the bearing plate 38 fluid must pass through the orifice 86 and as the flat surface 54 moves away from the bearing plate 38, fluid must pass back in through the orifice 86 to relieve the vacuum being created in the cavity 66. This effectively leads to a dampening of the motion of the spool valve 28 which prevents significant overshooting thereof responsive to movement of the steering wheel 42. Thus even in the high flow situations which exist in very heavy vehicles such as off-road trucks and the like, erratic steering motion is prevented, without increasing wheel effort and operating temperature due to increased friction.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In a fluid controller for a power steering system including a housing having a fluid inlet for connection to the discharge side of a fluid pump, an outlet for connection to the suction side of the fluid pump and a pair of ports for connection to the opposite sides of a dual acting hydraulic device such as a balanced cylinder of the power steering system for controlling the flow of pressurized fluid to the device, a gear set which serves as a fluid meter or as a manual pump, depending upon the operativeness of the fluid pump, a spool valve shiftable axially to control the flow through the inlet, the gear set, the cylinder ports and the outlet, a control shaft mounted for rotation on the housing responsive to movement of a steering wheel and coupled to the spool valve for effecting axial shifting of the spool valve in response to rotation of the control shaft, a wobble shaft passing from the interior of the spool valve to the gear set and a bearing plate through which the wobble shaft passes intermediate the gear set and the spool valve, the improvement comprising:

a member extending from an end of said spool valve adjacent said bearing plate;

a fluid filled cylindrical dash pot cavity formed in said bearing plate on a spool valve side thereof positioned to receive said member; and restricted flow means through which said fluid is forced responsive to axial movement of said spool valve thereby preventing overshoot of said spool valve responsive to rotation of said control shaft and resulting vibratory instability by said power steering system.

2. An improvement in a fluid controller as in claim 1, wherein said member comprises said end of said sleeve valve adjacent said gear set plus a piston of internal diameter at least equal to the internal diameter of said end of said sleeve valve adjacent said gear set extending from said sleeve valve towards said gear set having an annular flange extending outwardly therefrom fitting within said cavity slidingly against the cylindrical surface thereof.

3. An improvement in a fluid controller as in claim 2, wherein said restricted flow means includes an orifice passing longitudinally through said flange.

4. An improvement in a fluid controller as in claim 2, wherein said end of said spool valve is formed into a collar of internal diameter larger than an internal diameter of the remaining portion thereof and said piston has a portion thereof with an external diameter substantially equal to the internal diameter of said collar and which is fit matingly therewithin.

5. An improvement in a fluid controller as in claim 1, wherein said dash pot cavity is postioned to receive said end of said spool valve and wherein said restricted flow means comprises an orifice passing from said cavity through said bearing plate to the vicinity of said gear set.

6. An improvement in a fluid controller as in claim 5, wherein said end of said spool valve is formed into a collar of internal diameter larger than an internal diameter of the remaining portion thereof, said bearing plate includes a ring extending therefrom towards said spool valve, the internal diameter of said ring being generally equal to the internal diameter of the remaining portion of said spool valve and the external diameter of said ring being substantially equal to the internal diameter of said collar, said ring and said collar being generally equal in length, and said collar sliding upon said ring into and out of said cavity responsive to rotation of said control shaft.

\* \* \* \* \*